July 3, 1951 — D. BLAISDELL — 2,559,390
CENTRALIZED TRAFFIC CONTROL SYSTEM
Filed July 3, 1947 — 5 Sheets-Sheet 1

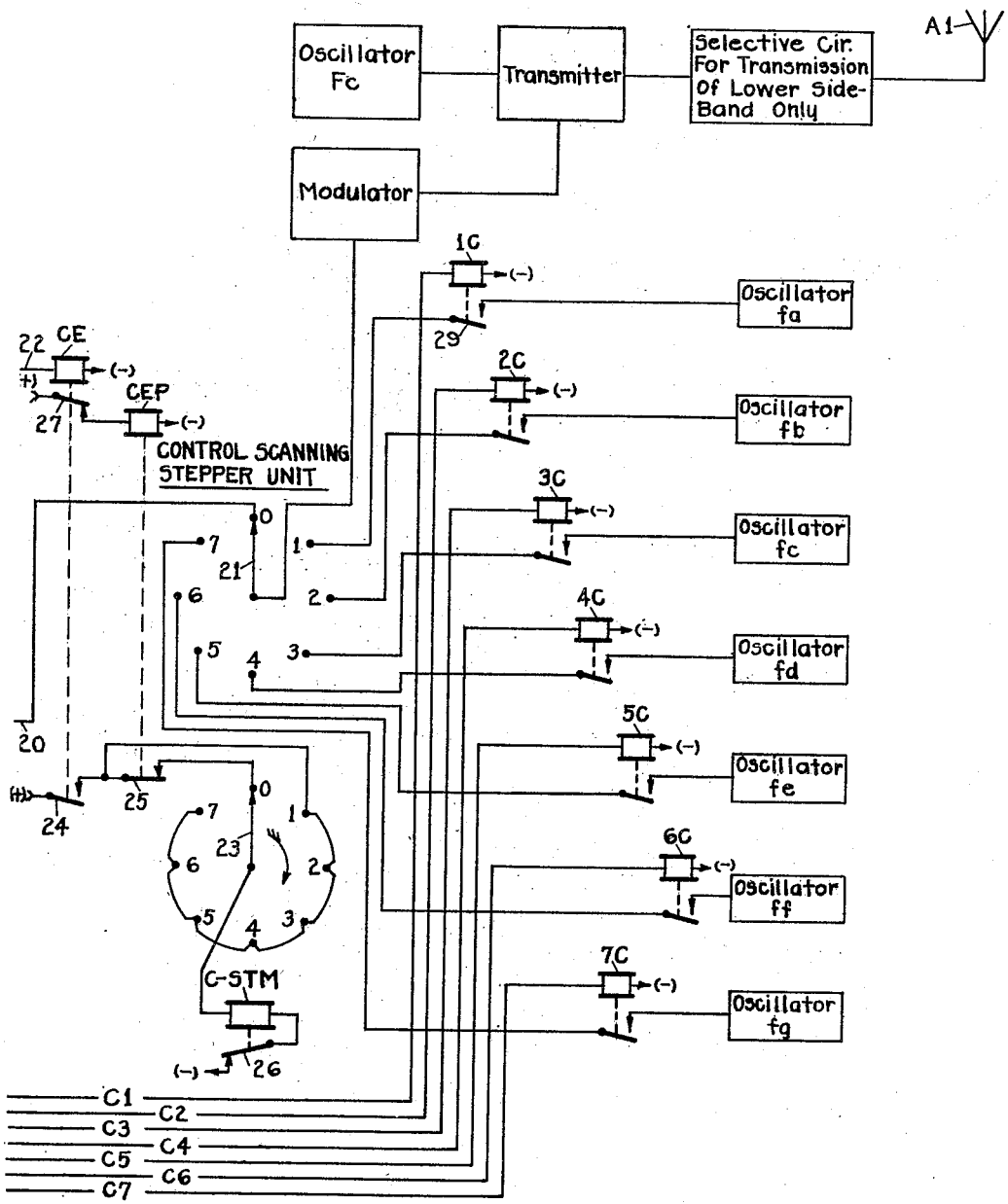

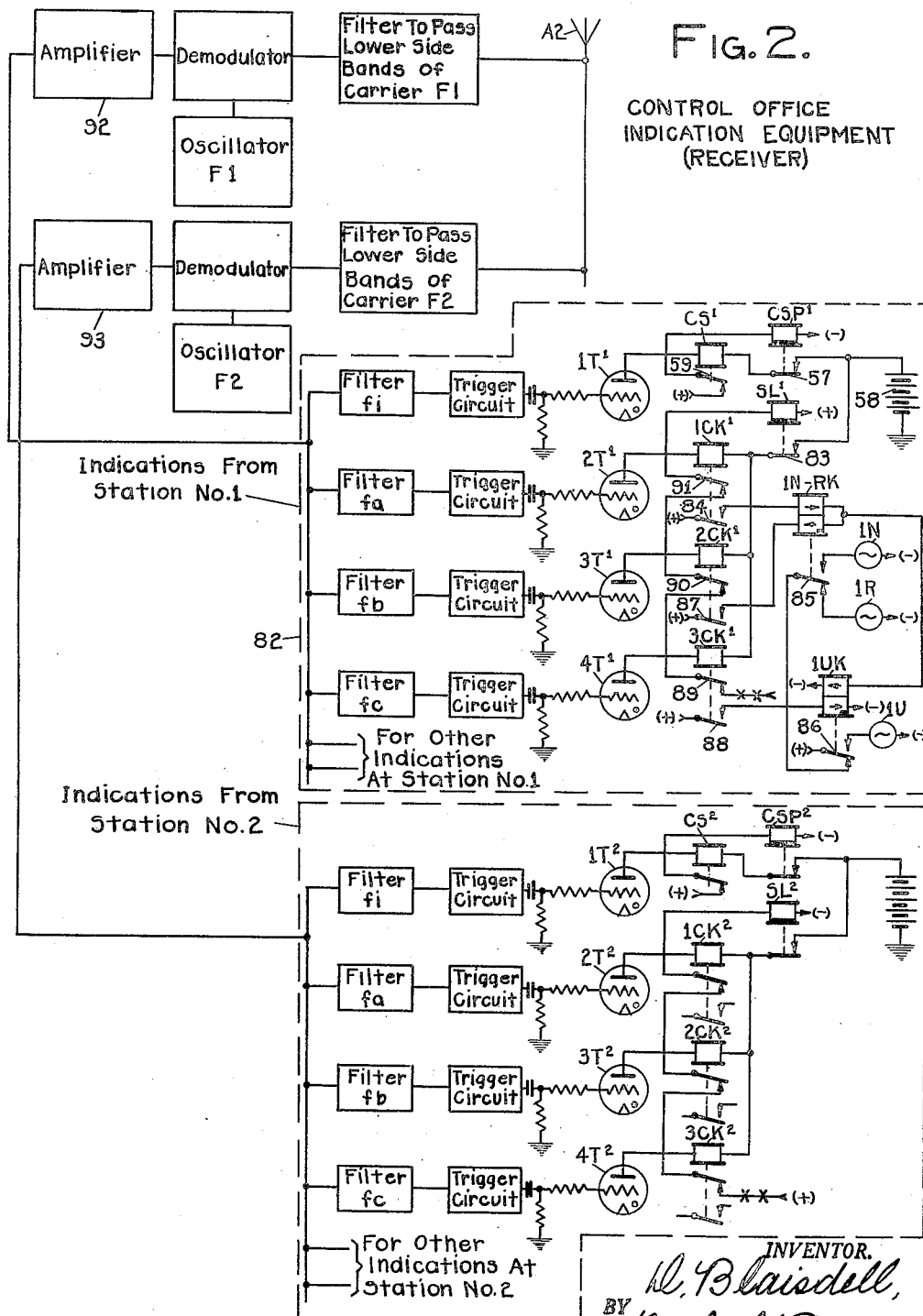

July 3, 1951  D. BLAISDELL  2,559,390
CENTRALIZED TRAFFIC CONTROL SYSTEM
Filed July 3, 1947  5 Sheets-Sheet 4
FIG. 4.  FIELD STATION No. 1 (Indication Equipment) (Transmitter)
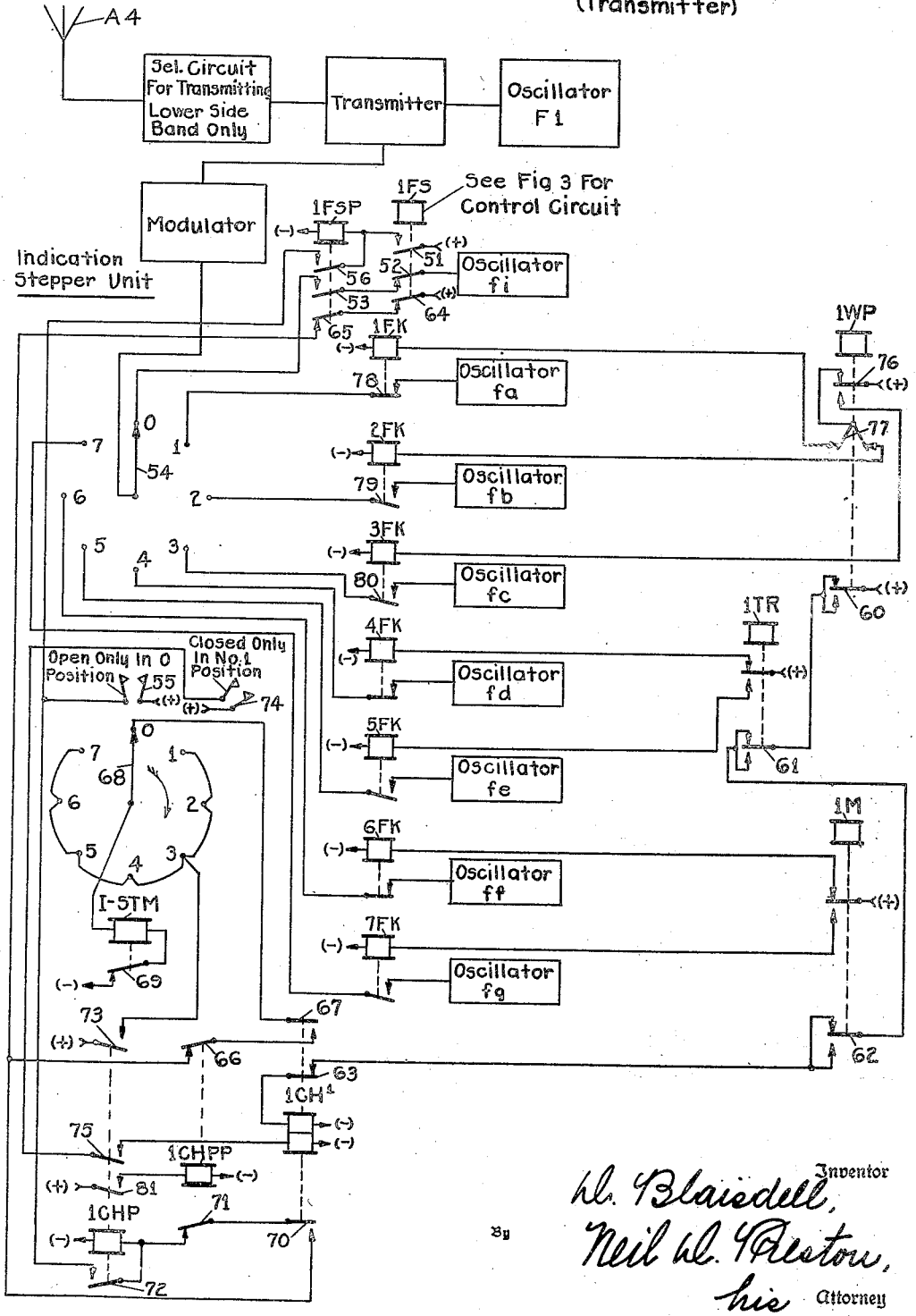
Inventor
W. Blaisdell,
Neil W. Preston,
By his Attorney

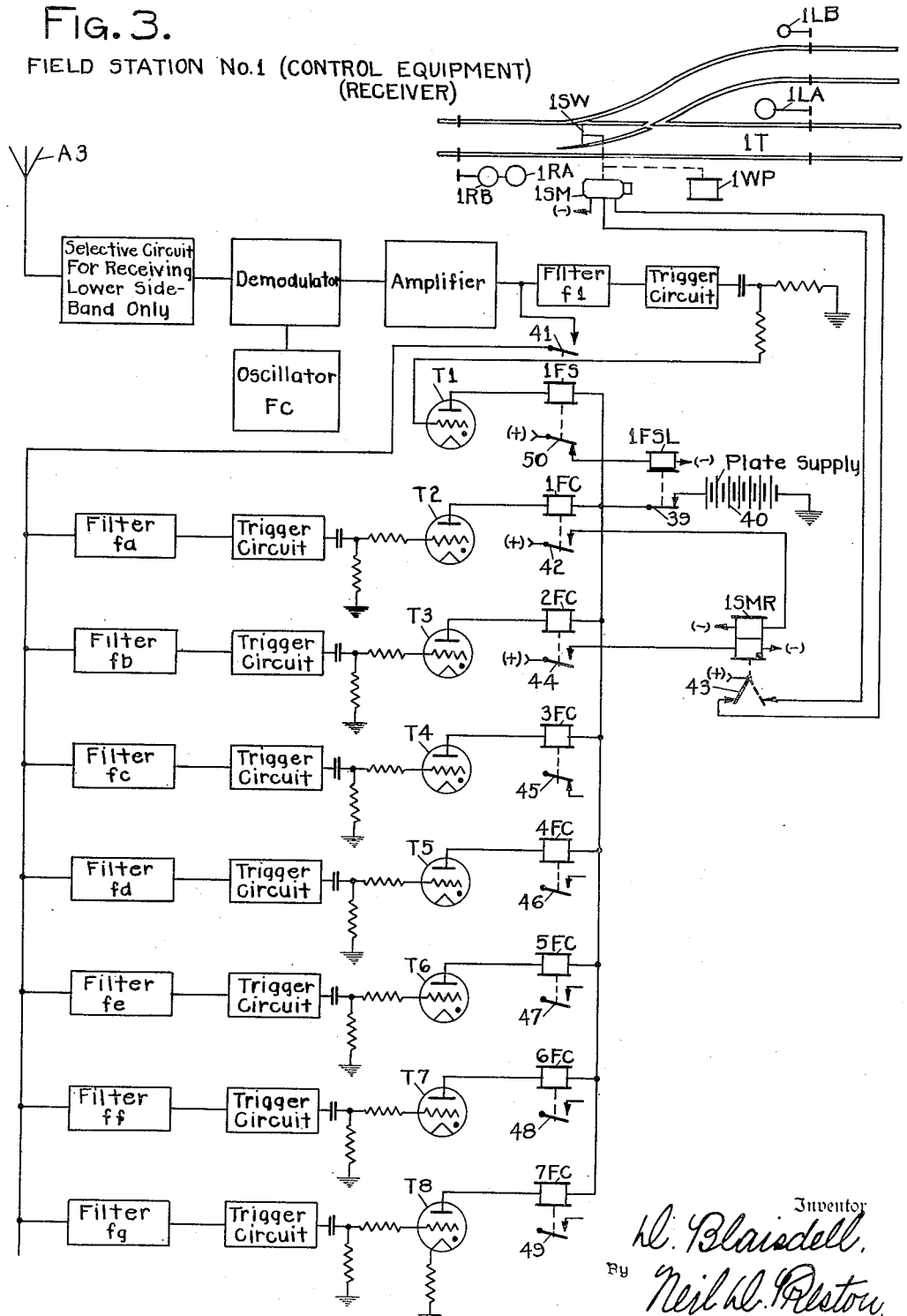

Patented July 3, 1951

2,559,390

UNITED STATES PATENT OFFICE 2,559,390

CENTRALIZED TRAFFIC CONTROL SYSTEM

Donald Blaisdell, Chili, N. Y., assignor to General Railway Signal Company, Rochester, N. Y.

Application July 3, 1947, Serial No. 758,833

16 Claims. (Cl. 177—353)

This invention relates to centralized traffic control systems for railroads and it more particularly pertains to such systems in which distinctive frequency currents are employed for the communication of intelligence between a control office and respective field stations.

In a centralized traffic control system a control office is connected by a suitable communication system with respective traffic control points along a stretch of railroad track, the apparatus at each of such points constituting a field station. Because of the large number of distinctive controls required to be communicated from the control office to the respective field stations for the control of track switches and signals, and because of the large number of distinctive indications required to be communicated from the field stations to the control office, it is expedient to employ a code communication system such as is disclosed, for example, in the patent to W. D. Hailes et al., No. 2,399,734 dated May 7, 1946, involving the connection of the control office with the field stations by a single line circuit upon which code characters are selectively impressed during respective control and indication cycles of operation of the communication system. Even this code communication system has certain limitations in that the line circuit is in some cases costly to maintain, and can readily be the cause of traffic delay when its continuity is interrupted by storm conditions and the like.

It is an object of the present invention to communicate between the control office and the respective field stations, without the use of line wires, by distinctively modulating a carrier wave as required for the communication of controls and indications during respective control and indication cycles between the respective field stations and the control office, the integrity of the communication of indications being maintained between the respective field stations and the control office, irrespective of failure of any part of the communication apparatus at any other field station.

Another object of the present invention is to reduce to a minimum the generation of harmonics which can cause interference with the desired mode of operation of the system by allowing the modulation of a radiated carrier wave with but one frequency at a time, and also by limiting transmission to the radiation of a single side band only.

An object of the present invention with respect to the communication of controls from the control office to the respective field stations is to initiate the system from a normal state of rest into a cycle of operation in response to manual designation of controls to be transmitted to a selected field station, such cycle comprising a first modulation characteristic of the station being called, and following distinctive modulations on successive steps, one on each step, characteristic of the distinctive switch and signal controls which have been manually designated at the control office.

Another object of the present invention is to transmit a distinctive modulation frequency pulse from each field station to the control office at the end of each control cycle transmitted to that field station, such pulse indicating that the present control cycle has been received, and that the station control relay that has been responsive to such cycle at that field station has been restored to its normally-at-rest position.

Another object of the present invention is to require the reception of an indication at the control office that each control cycle has been receive at the field station for which it is intended before another control cycle can be initiated. Upon failure to receive such indication the operator at the control office may allow transmission of subsequent control cycles by actuation of a cancel button followed by designation of controls to be transmitted.

An object of the present invention with respect to the communication of indications from the field stations to the control office is to allow simultaneous transmission from all field stations by assigning each station a distinctive carrier frequency and thus obviating the necessity for lock out to allow but one station to transmit at a time.

Another object in the transmission of indications is to transmit the indications in cycles, one indication per step, by modulation of the carrier transmitted at distinctive frequencies selected by the particular devices which are to have their positions indicated at the control office.

Other objects, purposes, and characteristic features of the present invention will be in part obvious from the accompanying drawings and in part pointed out as the description progresses.

In describing the invention in detail, reference is made to the accompanying drawings in which those parts having similar features and functions are designated by like letter reference characters, such letter reference characters being generally made distinctive by reason of preceding numerals indicative of apparatus with which such parts are associated or indicative of an order of operation; and in which:

Figs. 1A and 1B when placed side by side respectively illustrate schematically the organization of the control office apparatus relative to the transmission of controls;

Fig. 2 illustrates control office apparatus relative to the reception of indications transmitted from the respective field stations;

Fig. 3 illustrates apparatus employed at a typical field station for the reception of controls transmitted from the control office; and, Fig. 4 illustrates the organization of apparatus at a typical field station for the transmission of indications to the control office.

Figure 1A:
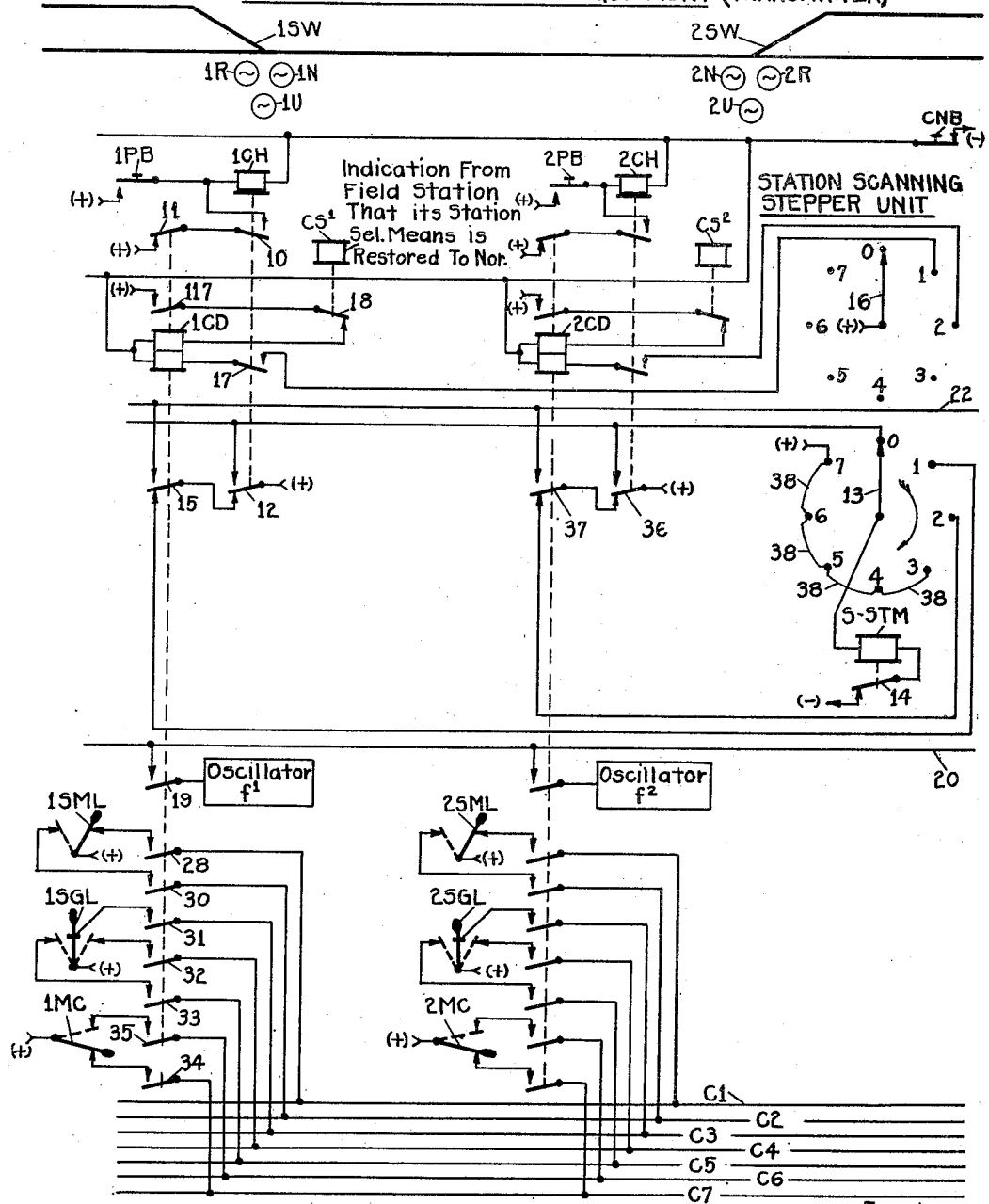

For the purpose of simplification of the disclosure of the present invention, a simple embodiment of such invention has been illustrated schematically in the drawings, more for the purpose of illustrating the mode of operation and principles involving, than for the purpose of illustrating the specific construction and location of apparatus that would be employed in practice. The symbols (+) and (—) have been used to indicate the respective connections to the positive and negative terminals of a suitable battery or other source of direct current.

With reference to Figs. 1A and 1B, the control office transmitter is illustrated as comprising a control machine having a miniature track diagram disposed on a suitable control panel, such diagram corresponding to the track layout in the field for which the centralized traffic control system is provided. Suitable switch and signal control levers SML and SGL, and maintainer's call levers MC are provided on the panel for the manual designation of controls to be transmitted to the respective field stations in accordance with the usual practice in a centralized traffic control system.

Associated with the initiation of the transmission of a control cycle to each of the field stations is a suitable start button PB which has associated therewith a change relay CH and a code determining relay CD. The relay CH is directly responsive to the actuation of its start button PB, and it governs the energization of the associated relay CD, only one relay CD being allowed to be picked up at any one time.

A station scanning stepper unit S-STM is provided at the control office for governing the order of transmission of controls through respective cycles of operation to the respective field stations in case an operator of the control machine has designated controls to be transmitted to several field stations so as to cause several relays CH to be picked up contemporaneously. Another scanning stepper unit C-STM is provided at the control office for governing the modulation of a carrier wave during successive steps with but one frequency per step.

Respective oscillators $f$ (provided with distinctive exponents) are provided for generating specific frequencies used in calling respective field stations to which such frequencies are assigned. Thus the oscillator $f^1$, for example, is provided for generating the frequency used for calling field station No. 1, and oscillator $f^2$ is provided for generating the frequency used in calling field station No. 2.

Oscillators are similarly provided for generating the frequencies used in defining the respective switch and signal and maintainer's call controls to be transmitted, one oscillator $f$ (provided with a distinctive succeeding small letter reference character) being provided for each position of each of the respective manually operable levers used in designating the largest number of required switch and signal controls and maintainer's call controls to be associated with a single field station.

A selector relay C is provided for association with each of the oscillators used for the transmission of controls for selectively governing whether or not that oscillator is to govern modulation of the radiated carrier wave during a particular step of a control scanning stepper unit C-STM.

With reference to Fig. 1B, a conventional carrier wave transmitter is illustrated in block form as being provided at the control office, such transmitter having its carrier wave modulated by the output of a suitable modulator which is also shown in block form, the input to such modulator being governed in accordance with a particular oscillator $f$ selected during each step of the respective scanner stepping units S-STM and C-STM. The output of the transmitter, rather than being connected directly to a suitable antenna, is illustrated as being coupled to the antenna through a selective circuit for transmission of lower side band only as shown in block form.

With reference to Fig. 2 receiving equipment is illustrated for selectively governing suitable indicator lamps which are conveniently disposed on the miniature track diagram so as to be indicative of conditions of the various control devices in the field and the presence of trains in various track sections. Such receiving apparatus comprises a receiving antenna which provides input for respective lower side band filters for the respective carrier frequencies to be received. It is thus provided that a filter is provided for each field station as it has been pointed out that each field station transmits at a different carrier frequency. Such filters are necessarily band-pass filters of a spread to pass all lower side band frequencies transmitted from the control office.

A suitable demodulator is provided at the control office for each of the carrier frequencies to be received, such demodulator having its input governed by the output of the sideband filter for the reception of the associated frequencies, and also governed by a suitable oscillator for use in beating with the sideband received to provide a demodulated output of the demodulator of a frequency corresponding to the modulation applied at the field station from which the sideband wave is received. A suitable amplifier, illustrated in block form for amplification of the output of each demodulator, is used for the energization of respective filters $f$, one filter being provided for each modulation frequency to be transmitted from the associated field station.

A suitable gas tube such, for example, as a thyratron tube is associated with each of the filters, such tube being provided with a bias to render that tube normally non-conductive and to render it conductive in accordance with the output of its respective associated filter through the medium of a suitable trigger circuit.

An indication relay CK is associated with each of the gas tubes in its anode-cathode circuit, and the energization of that relay is used to govern associated indication relays which in turn govern the energization of the indicator lamps on the control panel.

With reference to Fig. 3, field station receiving apparatus for field station No. 1 is illustrated, together with the track layout and switch and signal control apparatus at that field station.

It is thus illustrated that the left-hand end of a passing siding is connected to a main stretch of single track by the track switch 1SW which is power operated by a suitable switch machine 1SM. The signals 1RA and 1RB are provided for governing eastbound traffic (to the right) through the track switch 1SW, and the signals 1LA and 1LB are provided for governing westbound traffic (to the left) through the track switch 1SW. Although the symbols used for designating the respective signals indicate such signals being of the searchlight type, it is to be understood that other conventional forms of signal structures can be provided, such as semaphore signals, position light signals, and light signals having individual color lamp units, in accordance with the requirements of practice.

The carrier waves transmitted from the control office are received by a suitable antenna at field station No. 1, and the antenna is illustrated in Fig. 3 as providing input for the filtering apparatus illustrated in block form and designated as "Selective Circuit for Receiving Lower Sideband Only."

A suitable demodulator is provided having its input furnished by the output of the selective circuit for receiving lower sideband only and the output of the oscillator Fc. The oscillator is normally active to generate a frequency corresponding to that of the CW transmitter at the control office, and thus in beating the output of such oscillator with the frequency received, the output of the demodulator is of a beat frequency corresponding to the frequency used at the control office to modulate the carrier wave output of the CW transmitter.

A suitable amplifier is illustrated as having its input dependent upon the beat frequency output of the demodulator, and the output of the amplifier is directly connected to a suitable filter $f^1$, such filter being adapted to pass only the frequency corresponding to that transmitted from the control office for the station call of field station No. 1.

A station relay 1FS is provided as a means governing the effectiveness of control frequencies received for governing the respective switches and signals in accordance with whether the field station No. 1 is the station being called from the control office. It is thus provided that the relay 1FS is picked up only in response to the output of the filter $f^1$ through the medium of suitable trigger and gas tube circuits as required for rendering the selective control of the relay 1FS in response to the frequency of the filter $f^1$ positive and dependable.

Similarly the control filters $f$ (provided with succeeding small letter reference characters) are provided for directing the output of the amplifier into respective channels corresponding to the frequencies of the modulations received. A suitable gas tube such as a thyratron tube is provided in association with each of the filters with such a bias on its grid as to be normally non-conductive but to be rendered conductive in response to the output of its associated filter through a suitable trigger circuit, such, for example, as an Eccles-Jordan trigger circuit.

A frequency responsive relay FC is provided for each of the modulation frequencies to be received, and its winding is connected in the anode-cathode circuit of the gas tube for the associated frequency so as to be responsive upon the firing of the gas tube. A suitable relay 1FSL having slow drop away characteristics is provided for deionizing the gas tubes at the end of each control cycle received.

Suitable switch and signal control apparatus is assumed to be provided for governing the switch and signals at field station No. 1 in response to the selective energization of the relays FC for the respective frequencies. The relay 1SMR, for example, is illustrated as being of the magnetic stick type and is provided for governing the power operation of the switch machine 1SM in accordance with the respective switch control frequencies received at field station No. 1.

It is to be understood that the above described apparatus illustrated in Fig. 3 and provided for field station No. 1, is typical of apparatus provided at the other field stations that may be included in the system, the apparatus for such other field stations varying particularly in the distinctive frequency of the station filter.

With reference to Fig. 4, apparatus governing the transmission of indications from field station No. 1 to the control office is illustrated, and such apparatus is to be understood as being typical of that which is provided for the other field stations of the system. A suitable carrier wave transmitter is illustrated by block diagram in Fig. 4 as being provided, such transmitter providing a carrier wave of a frequency governed by the oscillator F1. Such frequency is to be understood as being distinctive from the frequency generated by similar oscillators of other field stations, and thus its transmission does not interfere with simultaneous transmission from other field stations.

The respective indications to be transmitted from field station No. 1 are characterized by the selective modulation of the carrier of the fundamental frequency F1. It is therefore provided that an oscillator generating a distinctive modulation frequency is associated with each indication to be transmitted, and a suitable modulator is provided for amplifying the frequency selected for transmission, the input to the modulator being of different frequencies for different steps of the stepping unit I-STM so as to allow the modulation of the fundamental carrier wave by but one modulation frequency at a time.

The output of the modulator is applied to the transmitter to modulate the carrier wave of that transmitter, thus the output of the transmitter is of both a fundamental frequency and upper and lower sidebands. A suitable selector circuit for transmitting lower sideband only as indicated in block form in Fig. 4, is inserted between the output of the transmitter and the antenna for the purpose of filtering out the fundamental and the upper sideband waves and allowing the transmission of only the lower sideband.

Suitable change and change repeater relays CH and CHP and CHPP respectively are provided for governing the initiation of the respective indication cycles at field station No. 1 in a manner to be hereinafter more specifically considered.

Having thus considered the general organization of the apparatus of the systems for this embodiment of the present invention, the specific circuit organization will be hereinafter described when considering the mode of operation of the system under typical conditions to be encountered in practice.

*Operation*

The general order of operation of the system in the use of frequencies for the communication of the controls to the respective field stations, and for the communication of indications from their respective field stations to the control office, is to generate a carrier wave at a particular assigned constant frequency, modulate such carrier wave at a selected lower frequency, and permit the transmission of but one of the sidebands resulting from such modulation. Thus, for example, if a carrier wave of 2,000 kc. is modulated with a selected modulation frequency, for example, of 550 kc., the lower sideband that is transmitted is of a frequency of 1450 kc.

Upon receiving this lower sideband at a receiving station, by beating the 1450 kc. received with the output of a 2,000 kc. oscillator, a resultant beat frequency of 550 kc. is obtained corresponding to the frequency of modulation of the 2,000 kc. carrier wave at the transmitter station.

It is to be understood that different bands of frequencies can be used in accord with the requirements of practice, the frequencies for this embodiment being selected particularly because of the adaptability of frequencies in the range of 500 to 900 kc. to use with crystal filters and crystal controlled oscillators, it being possible by the use of crystals to provide distinctive separation of frequencies separated by as little as 4 kc. Thus by the use of crystal filters and crystal controlled oscillators one hundred different frequencies can be used for the communication of controls and indications in the band from 500 to 900 kc. It is to be understood however, that if such distinct separating is not required, other types of filters, such as LC filters can be used, and other types of oscillators can be employed.

The system as illustrated in the drawings is in a state of rest in that it is assumed that there are no stored controls awaiting transmission, and that there are no stored indications awaiting transmission and thus under such conditions there are no modulations applied to the carrier wave transmitter at the control office, or at any of the field stations, and there is no sideband frequency generated for transmission from any of the transmitter stations.

Control office transmission during control cycle

With reference to Fig. 1A, the initiation of a control cycle is effected in response to the actuation of the push button PB associated with the field station to which controls are intended to be transmited. Thus, for example, if it is desired to initiate the system into a cycle of operation for the transmission of controls to field station No. 1, the push button 1PB is actuated, and the actuation of that button establishes an obvious circuit for the energization for the relay 1CH to cause that relay to be picked up. The picking up of relay 1CH closes a stick circuit at front contact 10 for maintaining the 1CH relay picked up dependent upon back contact 11 of relay 1CD and the normally closed contact of the cancel button CNB.

By the picking up of relay 1CH, the armature of the stepper S-STM is momentarily attracted by the energiaztion of a circuit extending from (+) including front contact 12 of relay 1CH, scanning contact finger 13 of stepper S-STM, winding of stepper S-STM, and back contact 14 of stepper S-STM, to (−). The energization of this winding is effective to attract the armature and open back contact 14. The opening of the circuit for the winding of stepper unit S-STM, by releasing the attracted armature of the stepper unit mechanism, actuates the scanning finger 13 through its first step to position No. 1 by suitable pawl and ratchet wheel means or other well known structure for a scanning stepper unit of this character.

The actuation of the stepper through its first step opens the connection of the contact finger 13 to the fixed contact in position No. 0 and the contact finger 13 is positioned to close a circuit in position No. 1. Inasmuch as the relay 1CH is assumed to be picked up, the circuit including the contact of stepper S-STM in position No. 1 and the scanning contact finger 13 is open at back contact 12, and thus further stepping is delayed until the relay 1CH is dropped away, and until the relay 1CD is dropped away at the end of the cycle to close its back contact 15.

The actuation of the scanning contact finger 16 of the stepper unit through the first step to position No. 1 causes the picking up of relay 1CD. This is accomplished by the energization of the lower winding of relay 1CD by a circuit extending from (+) including scanning contact finger 16 in position No. 1, front contact 17 of relay 1CH, lower winding of relay 1CD and cancel button CNB to (−). The picking up of relay 1CD, by closing its front contact 117, establishes a stick circuit by which such relay is maintained picked up in a manner which is dependent upon back contact 18 of the check pulse relay $CS^1$. The relay $CS^1$ is energized in response to a check pulse transmitted from the field station No. 1 in a manner to be hereinafter considered. The picking up of relay 1CD, by opening back contact 11 in the stick circuit for relay 1CH allows the restoration of relay 1CH, the relay 1CH being made slightly slow acting to insure the closing of the stick circuit for relay 1CD before the relay 1CH is dropped away to open the pick up circuit for relay 1CD at front contact 17. The picking up of relay 1CD prior to the dropping away of relay 1CH holds the circuit for the stepper S-STM open until the end of the cycle.

Immediately upon the picking up of the relay 1CD, energy is fed to the modulator of Fig. 1B from the osciliator $f^1$ shown in Fig. 1A by a circuit including front contact 19 of relay 1CD, wire 20, and scanning contact finger 21 of stepper unit C-STM in its 0 position.

The output of the modulator of Fig. 1B is fed to the transmitter where it modulates the oscillator frequency Fc to provide an output of the transmitter of the amplitude modulated fundamental frequency current together with upper and lower side bands. All but the lower side band is filtered out by the selective circuit for transmission of lower side band only and thus the only energy radiated by the antenna A1 is that of the lower side band.

The duration of the station call pulse is determined by the combination of the relay CE and the stepper C-STM. Subsequent to the picking up of relay 1CD (see Fig. 1A) and the dropping away of relay 1CH, the relay CE becomes energized by a circuit extending from (+) including back contact 12 of relay 1CH front contact 15 of relay 1CD, wire 22, and winding of relay CE, to (−).

The picking up of relay CE by the closure of its front contact applies energy to the winding of the stepper unit C-STM to provide for the actuation of the respective scanning fingers 21 and 23 of that stepper unit clockwise from the 0 position to position No. 1. Such circuit extends from (+) including front contact 24 of relay CE, front contact 25 of relay CEP, scanning contact finger 23, winding of stepper C-STM, and back contact 26 of stepper C-STM, to (−). The movement of finger 21 away from its 0 position terminates the station call frequency pulse.

The relay CEP is dropped away because of the opening of a circuit by which it is normally energized at back contact 27 of relay CE, and thus the circuit just described for the stepper C–STM is open at front contact 25 subsequent to the actuation of the stepper for the first step in order to cause the stepper to stop at the 0 position after it has completed 360° of rotation. Positive battery energy is applied to the respective contacts in positions 1 to 7 inclusive which are associated with the scanning finger 23, through front contact 24 of relay CE, so it is provided that the stepper C–STM continues to step to form a complete cycle of transmission, such cycle being illustrated as providing 7 steps for the transmission of distinctive control pulses, although it is to be understood that the number of steps provided will necessarily vary in accordance with the requirements of practice.

The scanning contact finger 21 when actuated from the 0 to the No. 1 position opens the circuit by which the output of the oscillator $f^1$ has been connected to the modulator and conditions a circuit to provide for the connection of the output of oscillator $fa$ to the modulator provided that the relay 1C is picked up. Similarly the scanning finger 21 when reaching position No. 2 connects the output of the oscillator $fb$ to the modulator, provided that the control relay 2C is picked up. In a similar manner the oscillators $fc$, $fd$, $fe$, $ff$, and $fg$, are rendered effective during respective third, fourth, fifth, sixth and seventh steps to apply their frequencies to the modulator in accordance with the energization of their associated relays C.

The control of the relays C is such as to render the respective oscillators selectively connected or disconnected to the respective stepping contacts of the stepper unit C–STM in accordance with the positions of the switch and signal and maintainer's call levers for the station to which the controls are transmitted. Thus for example, assuming a cycle to have been initiated as has been described for transmission of controls to field station No. 1, the lever 1SML in its right-hand position provides for the energization of the control relay 1C and the energization of this relay provides for the modulation of the carrier with the frequency $fa$ during the first step. The circuit for relay 1C under such conditions extends from (+) including lever 1SML (see Fig. 1A) in its right-hand position, front contact 29 of relay 1CD, channel wire C1, and winding of relay 1C, to (—). The closing of front contact 29 of relay 1C provides that the oscillator $fa$ is connected during the first step to the modulator through the scanning finger 21.

Assuming the switch control lever 1SML to be in its right-hand position as shown, the actuation of the stepping mechanism C–STM from the first to the second step terminates the connection of the oscillator $fa$ output to the input of a modulator, and provides for no connection to the modulator during the second step because the circuit for relay 2C is open in accordance with the position of the switch control lever 1SML. If, however, the lever 1SML had been actuated to its left-hand position, the relay 2C would have been energized by a circuit extending from (+) including lever 1SML in its left-hand position, front contact 30 of relay 1CD, channel wire C2, and winding of relay 2C, to (—). It will thus be readily apparent that the switch control lever 1SML selects either the energization of relay 1C or relay 2C and thus selects either the modulation of the transmitter at the frequency $fa$ during the first step or the modulation of such transmitter by the frequency $fb$ during the second step. It will therefore be apparent that a pulse is transmitted on either the first or second step but not both steps in one cycle. It is to be understood, however, that if a larger number of distinctive controls are required to be transmitted so as to approach the capacity of the stepping mechanism C–STM, suitable circuit selections can be provided so as to provide for the selection of either frequency current $fa$ or $fb$ for modulation of the carrier on the first step in accordance with whichever relay 1C or 2C is picked up. If the frequency currents are to be selectively combined on the same step as above described, they should be properly grouped on each step so that only one of such frequency currents can be transmitted at a time in accordance with the position of an associated switch, signal or maintainer's call lever or the like.

The relays 3C, 4C and 5C are selectively controlled in accordance with the positioning of the signal control lever 1SGL (see Fig. 1A) in a manner similar to that which has been specifically described for the control of the relays 1C and 2C in accordance with the positioning of the switch control lever 1SML. Thus, when the lever 1SGL is in its center position, a circuit is closed through front contact 31 of relay 1CD to apply energy to channel wire C3 and thus provide for the energization of the relay 3C, the center position of the lever 1SGL being assumed to correspond to the designation of the putting to stop of the signals at field station No. 1. If the operator desires to clear a signal at field station No. 1 for governing traffic to the right, he actuates the lever 1SGL to its right-hand position, and by such operation the circuit for relay 3C is opened at the lever 1SGL, and a circuit is closed for the relay 4C including front contact 32 of relay 1CD and channel wire C4. If, on the other hand, it is desired to designate a control for clearing a signal for governing traffic to the left at field station No. 1, the lever 1SGL is actuated to its left-hand position, and thus provides for the picking up of relay 5C through front contact 33 of relay 1CD and the control wire C5. It will therefore be readily apparent that a relay 3C, 4C or 5C is picked up while a control cycle is transmitted in accordance with the position of the signal control lever SGL for the field station being called during that cycle.

The lever 1MC for designating a maintainer's call governs the relays 6C and 7C in accordance with whether such lever is in its actuation or restoration positions. The lever 1MC is illustrated in its restoration position and provides for the energization of the relay 7C during each control cycle of operation for the communication of controls to field station No. 1 by a circuit including front contact 34 of relay 1CD and the control wire C7. If the lever 1MC is operated to its upper position for the designation of a maintainer's call to be effective at field station No. 1, the relay 6C rather than the relay 7C is picked up by a circuit including front contact 35 of relay 1CD and the control wire C6.

From the specific circuit organization that has been described it will be observed that the control modulation frequencies are successively applied to the transmitter, one at a time, there being three control pulses transmitted during the cycle, one for designation of the switch position, one for designation of the control of the signals, and one for designation of a maintainers call control. These are the particular controls most generally required to be transmitted to a simple field station as illustrated by the track layout of Fig. 3, but it is to be understood that controls for a greater number of switches and signals can as well be transmitted according to the general principles of the system as have been described.

After the stepping of the stepping unit C–STM has been completed through a complete cycle, the scanning contact fingers 21 and 23 are restored to their normal 0 positions, but the opening of front contact 25 of relay CEP has prevented the application of energy to the winding of the stepper C–STM in its 0 position.

Although the cycle of operation for the transmission of controls has been completed, the relay 1CD is still maintained picked up by its stick circuit, and the relay CE is still maintained energized in accordance with the relay 1CD being picked up. The restoration of the relay 1CD, as has been described, is dependent upon the reception of a check pulse from field station No. 1 indicating that the station relay at that field station has been picked up during the cycle, and has been restored at the end of the cycle to its normally deenergized position. Thus, upon the reception of such check pulse, the picking up of the relay CS′, by opening back contact 18 in the stick circuit for relay 1CD, causes that relay to be dropped away, and the dropping of that relay, upon opening front contact 15, causes the dropping away of relay CE (see Fig. 1B), which in turn closes back contact 27 to restore the relay CEP to its normally energized position and thus conditions the stepper unit C–STM for operation during a subsequent cycle.

The relay 1CD (see Fig. 1A) in dropping away under such conditions, by the closing of its back contact 15, establishes a circuit through the scanning contact 13 of the station scanning unit S–STM to attract the armature of that mechanism and thus actuate the scanning contact fingers 13 and 16 to their No. 2 positions. By the actuation of the scanning contact finger 16 to position No. 2, a circuit is closed whereby the relay 2CD can be picked up for transmission to field station No. 2 provided that a start for transmission to that field station has been initiated by the actuation of the button 2PB and the picking up of the relay 2CH. If such initiation has been rendered effective, a cycle of operation is initiated for transmission of controls to field station No. 2 in a manner corresponding to that which has been described with respect to the initiation of a cycle of operation for the transmission of controls to field station No. 1. The levers 2SML, 2SGL and 2MC are assumed to be provided for designation of respective switch, signal, and maintainers call controls for transmission to field station No. 2, and it will be readily apparent that the same frequencies are selected for communication of controls in accordance with the positions of these levers during respective steps of the stepper unit C–STM as have been described as being transmitted in accordance with the actuation of corresponding switch and signal control levers to similar positions for the transmission of controls to field station No. 1. The transmission to field station No. 2 is of course distinctive because of the particular station call frequency generated by the oscillator $f^2$ (see Fig. 1A) which is particularly characteristic of transmission of controls for that field station.

After the transmission to field station No. 2 has been completed, if it is assumed that such transmission has been initiated, or in any case, at the time when the relays 2CH and 2CD are both dropped away, a circuit is closed for the energization of the winding of the stepper unit S–STM to actuate the scanning contact fingers 13 and 16 of that unit to the next stepping position. Such circuit extends from (+) including back contact 36 of relay 2CH, back contact 37 of relay 2CD, scanning contact finger 13, winding of stepper unit S–STM, and back contact 14 of stepper unit S–STM, to (−). Thus, in a similar manner other field stations can be scanned for transmission as required, and suitable means such as the jumpers 38 illustrated as being applied to the spare contacts of the stepper can be employed to render the stepping complete throughout a cycle of the station scanning unit. It is thus provided that the actuation of the station stepper S–STM to the position No. 3 applies energy directly in an obvious manner through the jumpers 38 to the magnet to cause stepping to be effective through successive steps until the 0 position is reached. If there are no change relays CH picked up at the time when the scanner S–STM completes one rotation of its scanning contacts, such stepper remains in its 0 position until another start is initiated. It is thus provided that the picking up of any relay CH initiates the station stepper unit S–STM, and that when initiated such stepper unit steps through successive positions until a position is reached corresponding to a station for which a cycle has been initiated by the picking up of the relay CH. Under such conditions, the stepper S–STM is maintained in that position until the reception of a check pulse from the associated field station allows the release of the relay CD at the control office for that field station in order that an energizing circuit may be closed for the stepper S–STM for actuation of that unit to the next step. In other words, the stepper unit S–STM steps through a complete cycle when initiated, hesitating only on the steps to which stations are assigned which have controls designated for transmission, and thus in one cycle of operation of the stepper unit S–STM, there is a channel provided for the transmission of a control cycle to each field station of the system. The control stepper C–STM, however, operates through a complete cycle for each control cycle transmitted.

It will be noted from the circuit organization that has been described that the control of the relays CD by the station stepper S–STM provides for the transmission of cycles to the field stations in a predetermined order, irrespective of any lower numbered field stations that may have starts designated during a cycle of operation of the station scanning unit. This arrangement provides that even though field station No. 1 may have preference in case two start buttons including button 1PB are simultaneously actuated when the system is initially at rest, if the button 1PB is again actuated at a subsequent time before a complete cycle of scanning of the stations by the station scanning unit is completed, the completion of the station scanning allows each of the other stations to transmit a first cycle before the second cycle for the station No. 1 can be transmitted. By this arrangement, although the controls to the respective stations are not necessarily transmitted strictly in their order of designation, by always selecting the next higher number station for transmitting the next following cycle, the transmission of controls to any one field station cannot long be delayed even though new starts are constantly being initiated for transmission of controls to various field stations.

If for any reason the control office fails to receive a check pulse transmitted from a field station, the operator may cancel all designated starts by the actuation of the cancel button CNB (see Fig. 1A). This cancel button CNB, is included in the circuits for all relays CH and CD, and the actuation of the button restores all relays CH and CD to their normally deenergized positions, and thus provides for the continued stepping of the station stepper unit S-STM to complete any cycle of operation of that unit that has been initiated. The subsequent designation of starts for transmission of controls to respective field stations initiates the transmission of controls in a manner which has been described. In this way, the attention of the operator is called to any condition where the field station apparatus fails to transmit a check pulse at the end of a control cycle, but the system is not tied up because of failure to receive this pulse in that the operator by actuation of the cancel button CNB can allow the transmission of controls in response to the subsequent actuation of start buttons PB, either to the field station failing to transmit the check pulse, or to any other field stations.

*Reception of controls*

The system for the reception of controls as illustrated in Fig. 3, for example, for the reception of controls at field station No. 1, is accomplished without requiring a stepper organization in synchronism with the stepper at the control office in that a distinctive frequency is received for each distinctive control communicated, and thus it is not essential that means be provided at the field station to determine during which step the particular pulse received has been transmitted at the control office. It is thus provided that the receivers at the respective field stations comprise essentially receiving means having distinctive filter circuits, the output of which provides for the energization of control relays to position such relays in accordance with the frequency pulses received, and thus govern the operation of respective devices at the field stations to positions which have been designated at the control office.

The carrier waves received by the antenna A3 of Fig. 3 are applied to the demodulator through a suitable selective circuit for receiving lower sideband only, such circuit being adapted to pass the band of lower sideband frequencies including frequencies transmitted from the control office for the station call pulse, and for the respective controls that are transmitted. Thus, if the station selection side-band tones are in a frequency range relatively close to the tones for controls, the side band filters for the respective field stations can all be the same and each band pass filter will pass all lower side band frequencies transmitted from the control office.

The oscillator Fc at field station No. 1 (see Fig. 3), and at each of the other field stations, generates a constant frequency corresponding to that of the corresponding oscillator Fc (see Fig. 1B) at the control office. The output of the oscillator Fc at field station No. 1 (see Fig. 3) is combined with the lower sideband input to the demodulator to generate a beat frequency output of the demodulator corresponding to the particular tone frequency at which the carrier frequency Fc at the control office has been modulated. Such beat frequency current is fed to the input of the amplifier, and the output of such amplifier becomes the input of the filter $f^1$. The filter $f^1$ is tuned to a frequency corresponding to that used for modulating the carrier at the control office as a station call frequency for field station No. 1, and thus when there is an output of this filter, it is in response to the station call for field station No. 1 from the control office. It is thus provided that the filter $f^1$ is characteristic of field station No. 1 only, and that each of the other field stations has a filter tuned to a distinctive frequency in correspondence with the tone frequency current generated at the control office for the station call for that particular field station.

When there is an output of the filter $f^1$ characterizing the call of field station No. 1, the associated trigger circuit is triggered to momentarily make the grid of the gas tube T1 sufficiently positive to render that tube conductive and thus provide for the picking up of the relay 1FS which is included in its anode-cathode circuit in series with front contact 39 of the normally energized relay 1FSL and a suitable direct current plate supply 40.

Upon the picking up of relay 1FS, the closing of front contact 41 connects the output of the amplifier to the input of all filters fa to fg inclusive which are used in association with control circuits, and thus it is provided that the output of the amplifier is applied to the filters fa to fg inclusive for only the particular field station being called. The filters will be readily recognized as being tuned to correspond to respective oscillator frequency currents generated at the control office by use of corresponding reference characters indicative of corresponding frequencies. Thus, for example, the filter fa of Fig. 3 is tuned to a frequency corresponding to that generated at the control office by the oscillator fa as shown in Fig. 1B.

If the first tone following the station call tone in a control cycle is at the tone frequency fa, output of the filter fa for that frequency acts upon the trigger circuit, and it is thus provided that the trigger circuit associated with that tone frequency momentarily makes the grid of the tube T2 sufficiently positive to trigger that tube and thus provide for the picking up of the relay 1FC in the anode-cathode circuit, such relay being energized through the front contact 39 of the slow release relay 1FSL for reasons to be hereinafter pointed out.

In response to the picking up of relay 1FC, the upper winding of the magnetic stick relay 1SMR is energized through front contact 42 of relay 1FC with a polarity to actuate the contacts of that relay to their left-hand positions, and thereby select by the contact 43 the particular polarity for energization of the motor of the switch machine 1SM to provide for the power operation of the track switch 1SW to its normal position.

If, on the other hand, the switch machine lever 1SML at the control office (see Fig. 1A) is actuated to a position for causing the track switch to be actuated to its reverse position, the tone frequency fb is selected for transmission rather than the frequency fa in a manner which has been heretofore described when considering the transmission of controls from the control office, and the reception of that tone at field station No. 1, provides for the picking up of the relay 2FC in the anode-cathode circuit of the gas tube T3 because of the triggering of that tube by the output of the associated filter fb and trigger circuit. The picking up of relay 2FC under such conditions is effective by the closing of front contact 44 to energize an obvious circuit for the lower winding of the relay 1SMR to actuate the contacts of that relay to their right-hand positions, and thereby select by contact 43 in its right hand position the polarity for operation of the switch machine 1SM to its reversed position, and thereby position the track switch 1SW to correspond with the particular reverse control that has been designated for that track switch at the control office.

The specific means that has been described for the control of the track switch 1SW at field station No. 1 is to be considered as typical of the means by which other devices at field station No. 1, such as the signals and the maintainers call indicators, are controlled in accordance with controls selected for transmission at the control office by the respective signal and maintainers call control levers. It is thus provided that the reception of other tone frequencies transmitted during a cycle of operation for communication with field station No. 1 selectively governs the relays 3FC, 4FC, 5FC, 6FC and 7FC in accordance with the signal and maintainers call controls designated for transmission at the control office, and the control of the signals in accordance with the selective energization of the relay 3FC, 4FC and 5FC can be accomplished by circuit means, preferably subject to track circuit and safety control well known to those skilled in the art. The picking up of relay 3FC, by the opening of its back contact 45 is indicative of the stop control for the signals at field station No. 1 and it can be used to effect a stop control for the signals at field station No. 1 in a manner corresponding to the use of the relay B in Fig. 5 of the above mentioned Hailes et al. Patent No. 2,399,734. The picking up of relay 4FC, by closing its front contact 46, is indicative of a control clearing of signal 1RA or 1RB for governing traffic to the right, the signal cleared being selected by the position to which the track switch 1SW is operated in a manner more specifically disclosed in the above mentioned Hailes et al. patent. The picking up of relay 5FC is effective by closing its front contact 47 to provide for the clearing of a signal 1LA or 1LB, as selected by the position of the track switch 1SW, for governing traffic to the left.

The picking up of the relay 6FC at field station No. 1 is indicative of a call transmitted from the control office for the maintainer, and the closing of the front contact 48 of that relay is effective in any suitable manner as by control of a magnetic-stick relay (not shown) to govern a visual and or audible indication indicative of such call. The picking up of relay 7FC during a control cycle, by the closure of its front contact 49 is effective to restore the indicating means which may have been conditioned as has been described for calling a maintainer during a preceding cycle.

It has been described that the relays FC which are energized in anode-cathode circuits of respective gas tubes for the particular tones with which such relays are associated are energized through the front contact 39 of the normally energized relay 1FSL. The picking up of the station relay 1FS, however, in response to the first tone (station call tone) transmitted in a control cycle, is effective to open the circuit for the relay 1FSL at back contact 50, and thus cause that relay to be dropped away to open the anode-cathode circuits for the respective gas tubes and cause such tubes to be deionized. Inasmuch as the tones during the control cycle are successively transmitted, one at a time, the relay 1FSL is made sufficiently slow in dropping away so that there will be sufficient time for the conditioning of the apparatus to be controlled at field station No. 1 in response to the last tone transmitted during a control cycle. At the end of this time, the dropping away of the relay 1FSL deionizes all the gas tubes and opens the circuits for all of the relays FC and the relay FS to cause these relays to be dropped away and thus to be restored to their normally deenergized positions so as to be conditioned for selective energization during a subsequent cycle.

Because of the relay 1SMR being of a magnetic stick character, it is maintained in its last actuated position until another control circuit is closed for the energization of its windings, and thus energy is maintained on the switch machine 1SM for completing its operation, irrespective of the termination of the control cycle. This is in accordance with principles of operation well known to these skilled in the art, and it is to be understood that control apparatus other than the magnetic-stick relay 1SMR specifically illustrated can be provided for the control of the track switch 1SM in response to the relays 1FC and 2FC in accordance with the requirements of practice, such apparatus including electric locking and other protective features which are well known to those skilled in the art. It is also to be understood that the signal controls and maintainers' call control circuits are also maintained in their last actuated positions, as by the use of magnetic stick relays, or suitable stick circuit means until their control positions are changed by different controls received on subsequent control cycles.

*Transmission of control check pulse*

It has been pointed out in general that each control cycle that is transmitted from the control office requires the transmission of a reply pulse from the particular field station which is called by that control cycle, checking that the cycle has been received at that station, before another control cycle can be initiated. This reply pulse when transmitted from the field station that has been called is indicative both of the fact that the station relay FS for that field station has been picked up in response to the cycle, and that such relay has been restored to its normal deenergized position after the cycle is completed, thus checking that the gas tubes at the associated field station have been deionized and are thus conditioned for reception during a subsequent control cycle.

It has been described when considering the reception of controls at field station No. 1 that the relay 1FS is picked up in response to the station call for that field station, and that such relay is maintained picked up until the cycle is completed by timing measured by the slow drop away of the repeater relay 1FSL.

With reference to Fig. 4, the pick up of relay 1FS is effective by the closing of its front contact 51 to pick up relay 1FSP which has slow drop away characteristics sufficient to measure the duration of the check pulse to be sufficient for picking up a relay at the control office.

Upon the dropping away of relay 1FS at the end of a control cycle, with reference to Fig. 4, the output of the oscillator $fl$ is connected to the modulator to modulate the frequency $Fl$ of the oscillator associated with the transmitter at field station No. 1 and to provide for the transmission of a lower sideband pulse to the control office, which, at the control office, can be demodulated to the particular distinctive tone frequency $fl$ which is characteristic of the check pulse. The same tone frequency $fl$ is assumed to be transmitted as a check tone from each of the respective field stations at the end of the control cycle for transmission of controls to that field station. This tone is made distinctive as to the particular field station from which it is transmitted because of the distinctive frequencies F of the oscillators generating the carriers for the transmitters of the respective field station, these oscillator frequencies all being different.

To consider the circuits more specifically for the transmission of a check pulse, with reference to Fig. 4, the circuit by which the oscillator $fl$ is connected to the modulator at field station No. 1 includes back contact 52 of relay IFS, front contact 53 of relay IFSP, and the scanning contact 54 of the indication stepper unit I-STM in its 0 position. At the time this circuit is closed by the dropping away of relay IFS, the relay IFSP is deenergized and thus the termination of the pulse is rendered effective by the opening of the front contact 53 of relay IFSP when that relay is dropped away.

As will be more readily apparent as the description progresses, during the transmission of indications by a field station, the indication stepper unit may be in operation at the time that a control cycle is terminated, but in such case, rather than to transmit the check tone simultaneously with an indication tone during the indication cycle, a stick circuit is provided by which the relay IFSP is maintained steadily energized until the indication cycle is completed, and thus provides for the transmission of the check tone at the end of the cycle when the indication stepper unit I-STM has been restored to its normal 0 position. The stick circuit by which the relay IFSP is maintained picked up under such conditions extends from (+), including the contact 55 of the stepper unit I-STM which is open only in the 0 position of that mechanism, front contact 56 of relay IFSP, and winding of relay IFSP, to (—). This stick circuit is maintained closed during the stepping until the contact 55 is opened by the restoration of the indication stepper unit to its 0 position. At this time, the oscillator $fl$ is connected through the scanning contact 54 in the 0 position to the modulator to initiate the check tone pulse, and thus the timing of the pulse is initiated at the beginning of its transmission by the deenergization of the relay IFSP, even though an indication cycle may be in progress at the time when a control cycle is terminated at that field station.

*Reception of check pulse at the control office*

With reference to Fig. 2, the respective sideband radio carrier waves transmitted from the field stations are received by the antenna A2 and fed as input to the respective band-pass filter circuits as indicated by block diagram, each of these band-pass filter circuits having an organization to pass only the lower sideband frequencies that can be transmitted by a particular corresponding field station. Thus, for example, the filter to pass lower sidebands of carrier F1 will pass all of the lower sideband frequencies transmitted by field station No. 1 but no frequencies transmitted by any other field stations. In a similar manner, a lower sideband filter is coupled to the antenna A2 for each of the respective field stations in the centralized traffic control system, only the filter for the reception of sidebands from field station No. 2 having been illustrated in addition to the filter for the reception of sidebands from field station No. 1.

The output of the filter to pass lower sidebands of carrier F1 is combined with the output of the oscillator F1 in the demodulator to provide for an output of such demodulator of a beat frequency corresponding to the particular tone which has been used for modulation of the frequency current F1 at field station No. 1. This particular beat frequency current is fed through a suitable amplifier as illustrated, and the output of such amplifier becomes the input to respective tone filters which are tuned to the respective tone frequencies generated for transmission of the check pulse and respective indications from field station No. 1.

It is thus provided that the filter $fl$ of the upper group of filters in Fig. 2, which group is associated with receiving indications from station No. 1, is energized at its particular tuned frequency in accordance with the check tone transmitted from field station No. 1 at the end of a control cycle, and the output of such filter $fl$ acts upon the associated trigger circuit which in turn renders the grid of the gas tube $IT^1$ momentarily sufficiently positive to render that tube conductive and effect the picking up of the relay $CS^1$. The winding of relay $CS^1$ is included in the anode-cathode circuit of tube $IT^1$ in series with front contact 57 of relay $CSP^1$ and the "B" supply battery 58.

The relay $CS^1$ when picked up opens a circuit which is normally effective for the energization of relay $CSP^1$ at back contact 59, but because of the relay $CSP^1$ being slightly slow in dropping away, the front contact 57 in the anode-cathode circuit of the tube $IT^1$ is maintained closed for a sufficient length of time to allow the relay $CS^1$ to be effective to release relay ICD (see Fig. 1A) by the opening of back contact 18 in a manner which has been described when considering the transmission of controls from the control office to the respective field stations. That is, the relay $CS^1$ in picking up subsequent to the transmission of a control cycle to field station No. 1 is effective by the opening of its back contact 18 (see Fig. 1A) to provide for the dropping away of the relay ICD, the dropping away of which provides an energizing circuit for the station scanning stepping unit S-STM to allow that unit to be actuated to select another relay CD for energization in accordance with whatever corresponding change relay CH may be energized. The circuit by which the station scanning stepper unit S-STM is energized to actuate its scanning contact to its 0 position extends from (+) including back contact 12 of relay ICH, back contact 15 of relay ICD, scanning contact finger 13 in position No. 1, winding of stepper unit S-STM and back contact 14 of stepper unit S-STM, to (—).

*Transmission of indications*

After having considered specifically the mode of operation of the system for the transmission of check tone pulses from the field stations to the control office, it will be readily understood that the transmission of indications from the respective field stations to the control office is accomplished in a similar manner, except that because of there being a plurality of indications to be transmitted, each being identified by a particular tone, it is desirable to transmit the respective indication tones in a predetermined order, one at a time, rather than transmit all tones simultaneously for reasons that have been heretofore set forth with reference to the consideration of the mode of operation of the system in general.

The indication transmitting apparatus as illustrated for the typical field station No. 1 is normally inactive because of the normally energized condition of the change relay 1CH¹, such relay being maintained steadily energized by a stick circuit including contacts in series of the respective devices to be indicated at the control office so that the shifting in the position of any one of such devices is effective to drop the relay 1CH¹ and thereby initiate the transmission of an indication cycle. More specifically, the stick circuit for the relay 1CH¹ extends from (+), including contact 60 of relay 1WP, contact 61 of relay 1TR, contact 62 of relay 1M, front contact 63 of relay 1CH¹, and upper winding of relay 1CH¹, to (—). The relay 1WP repeats the respective full normal and full reverse positions of the track switch 1SW (see Fig. 3) in a manner well known to those familiar with the art; the relay 1TR is normally energized in accordance with the unoccupied condition of the OS track section 1T; and the relay 1M is normally energized in accordance with the signals at field station No. 1 all being at stop. It is thus provided, for example, that the clearing of a signal by shifting contact 62 of relay 1M initiates the transmission of an indication cycle. Similarly the shifting of the contact 61 of the track relay 1TR and/or the shifting of the contact 60 of the switch repeater relay 1WP is effective to initiate an indication cycle.

Assuming the relay 1CH¹ to be dropped away for the initiation of an indication cycle, the indication stepper unit I-STM is initiated by the energization of a circuit extending from (+), including back contact 64 of relay 1FS, back contact 65 of relay 1FSP, back contact 66 of relay 1CHPP, back contact 67 of relay 1CH¹, scanning finger 68 of stepper unit I-STM in the 0 position, winding of stepper unit I-STM, and back contact 69 of stepper unit I-STM, to (—). Upon the opening of back contact 69 of the stepper unit I-STM, the above described circuit is deenergized and the restoration of the armature of the stepper effects the operation of the scanning contact finger 68 to position No. 1.

The relay 1CHP is also energized in response to the dropping away of relay 1CH¹, such energization being by a circuit extending from (+), including back contact 64 of relay 1FS, back contact 65 of relay 1FSP, back contact 70 of relay 1CH¹, back contact 71 of relay 1CHPP, and winding of relay 1CHP, to (—). Although this pick up circuit is only momentarily closed because of the relay 1CH being restored upon the actuation of the scanning finger 68 to position No. 1 as is hereinafter described, the relay 1CHP is maintained picked up by a stick circuit which is closed upon the actuation of the scanning contact finger 68 from its 0 position. Such stick circuit extends from (+), including contact 55 of stepper unit I-STM that is closed except when the stepper is in the 0 position, front contact 72 of relay 1CHP, and winding of relay 1CHP, to (—).

The picking up of relay 1CHP, by closing its front contact 73, maintains energy in an obvious manner at the respective contact positions 1, 2, 3, 4, 5, 6 and 7 to provide for the successive stepping of the scanning contact finger 68 through the respective positions once operation has been initiated to actuate such finger to position No. 1 as has been described.

When the scanning contact finger 68 is actuated to position No. 1, the closing of the contact 74 provides for the restoration of the change relay 1CH¹ to its normally picked up position by the momentary energization of a pick up circuit extending from (+), including contact 74 of the indication stepper unit that is closed only in position No. 1, front contact 75 of relay 1CHP, and lower winding of relay 1CH¹, to (—). With its stick circuit reestablished, the relay 1CH is restored to its normal condition for detecting the next change in the position of the particular devices to be indicated by the indication communication system. It is thus provided that if a change in the position of one of these devices occurs during the transmission of the indication cycle, another indication cycle is initiated so that the new indication will be transmitted on the next indication cycle to insure against the possibility of loss of the indication because of the change having been effected after the stepper unit has transmitted the particular indication of that device.

With the stepper unit I-STM in its No. 1 position, the distinctive tone of oscillator $fa$ can be transmitted if the track switch 1SW is in its normal locked position. This conditional transmission is in accordance with the energization of the indication control relay 1FK by a circuit extending from (+) including front contact 76 of the switch indication relay 1WP, contact 77 of relay 1WP in its left-hand position, and winding of relay 1FK, to (—). It is thus provided that if the track switch 1SW is to be indicated as being in its normal position, such indication is manifest by the modulation of the carrier wave with the tone frequency $fa$ when the stepper unit is in its position No. 1 and contact 78 of relay 1FK is closed. In case the track switch 1SW is in a position other than its normal locked position, no tone is applied to the fundamental frequency F1 of the transmitter because of front contact 78 being open, and thus there is no lower sideband transmitted during that step in the indication cycle.

In accordance with the operation of the stepper unit to position No. 2, the scanning finger 54 conditions a circuit whereby the oscillator $fb$ can provide an input for the modulator provided that the relay 2FK is picked up to close front contact 79 in accordance with the track switch 1SW being in its reverse locked position. If this is the case, the relay 2FK is picked up by the energization of a circuit extending from (+), including front contact 76 of relay 1WP, contact 77 of relay 1WP in its right-hand position, and winding of relay 2FK, to (—). It is thus provided that the carrier of the transmitter is modulated by the output of the oscillator $fb$ during the second step of the indication stepper unit, only provided that the track switch 1SW is in its reversed locked position.

If the track switch 1SW is in a mid-position rather than being either full normal or full reverse, the relay 3FK is picked up by the energization of a circuit closed at back contact 76 of relay 1WP, and in accordance with the closing of front contact 80 of relay 3FK, it is provided that the carrier frequency current F1 of the transmitter is modulated by the output of the oscillator $fc$ during the time when the scanning finger 54 is in position No. 3 of the stepper unit.

It is similarly provided that the relays 1TR and 1M which are indicative of the conditions of occupancy of the OS track section and of the signals respectively, govern transmission of tones during the fourth, fifth, sixth and seventh steps in accordance with the tones assigned for communication of the respective positions of these devices.

The circuit including front contact 73 of relay 1CHP by which the stepper unit I–STM is actuated, step by step, is opened when the stepper mechanism is actued from position No. 7 to the 0 position. More specifically, when the scanning finger 68 is actuated from position No. 7 to position No. 0, the contact 55 in the stick circuit for relay 1CHP is opened and the relay 1CHP is dropped away because of its pick up circuit being opened at back contact 71 of the repeater relay 1CHPP. The repeater relay 1CHPP is picked up at any time when the relay 1CHP is picked up by the closing of its circuit at front contact 81, and because of the slow drop away characteristics of this relay, there is a time delay provided at the end of each indication cycle before another indication cycle can be initiated to insure the restoration to normal of the indication cycle control apparatus at the control office. In other words, sufficient time delay is provided between consecutive cycles at any one field station to allow for the deionization of the respective gas tube indication circuits at the control office at the end of one cycle before another cycle is initiated.

It is therefore provided that the relay 1CHP is dropped away at the end of each cycle, irrespective of the change relay 1CH¹, and the dropping away of that relay starts a timing period measured by the drop away time of the relay 1CHPP at the end of which the closure of back contact 66 of relay 1CHPP in the initiating circuit for the stepper unit I–STM provides that the stepper unit can again be initiated after relay 1CH is dropped away because of a change which has taken place to interrupt its stick circuit. At the same time that such initiating circuit can again be closed, the closure of back contact 71 of relay 1CHPP in the pick up circuit for relay 1CHP provides that relay 1CHP is picked up at the initiation of the cycle and maintained throughout the cycle by its stick circuit in a manner corresponding to that which has been described.

It will be noted that the inclusion of back contacts 64 and 65 of relays 1FS and 1FSP in the circuits for the actuation of the indication stepper unit provides that the stepper unit is not initiated during the reception of a control cycle after relays 1FS and 1FSP have been picked up. It is also provided by the inclusion of the back contact 65 of relay 1FSP in the circuit for the actuation of the indication stepper unit that the transmission of the check tone subsequent to the reception of the control cycle is rendered effective prior to the initiation of an indication cycle, if the relay 1CH (see Fig. 4) has been dropped away during the transmission of a control cycle for field station No. 1. It is therefore provided that if a change occurs at a field station during the reception of controls transmitted to that field station, the initiation of an indication cycle is delayed until the check tone has been transmitted at the end of such control cycle. It will be noted, however, that once an indication cycle is initiated, its completion is not interrupted by the reception of a control cycle.

*Reception of indications at the control office*

It has been described when considering the reception of a check tone at the control office that there are separate receiving channels provided for the reception of indications transmitted from the respective field stations, each channel comprising a filter to pass only the lower sidebands of the fundamental carrier frequency corresponding to that transmitted by a single field station. Thus, for example, the filter to pass lower sidebands of carrier F1 (see Fig. 2) is to pass the lower sidebands transmitted from field station No. 1 only, and the output of such lower sidebands filter when combined with the output of the oscillator F1 in the demodulator provides a demodulated beat frequency current as an input to the amplifier corresponding to the particular tone which has been employed at field station No. 1 for modulation of the frequency current F1 at station No. 1.

The output of the amplifier which is associated with the reception of indications from field station No. 1 is fed to the input of the various filters $fi$, $fa$, $fb$, $fc$, etc. which are grouped in the block 82 to indicate their being associated with the reception of indications from field station No. 1.

When the output of the amplifier which is associated with receiving indications from field station No. 1 is of the frequency $fa$, the filter $fa$ has an output sufficient to actuate the trigger circuit associated therewith, and such actuation of the trigger circuit renders the gas tube 2T¹ conductive and thus the relay 1CK¹ is picked up in the anode-cathode circuit of the tube 2T¹. The circuit for relay 1CK¹ includes the plate supply battery 58 and front contact 83 of the relay SL¹.

Upon the picking up of relay 1CK¹, the closure of its front contact 84 provides for the energization of the magnetic-stick indication relay 1N–RK with a polarity to cause that relay to be picked up and to close its front contact 85 to provide for the energization of the indicator lamp 1N for indicating the normal position of the track switch 1TS at field station No. 1. The circuit by which the relay 1N–RK is energized extends from (+), including front contact 84 of relay 1CK¹, upper winding of relay 1N–RK, and upper winding of relay 1UK, to (−). The energization of relay 1UK in the circuit just described provides that such relay is energized with a polarity to effect the dropping away of its contacts and thus the extinguishing of the lamp 1U which is associated therewith if such lamp has been energized because of an indication being received that the track switch 1TS at field station No. 1 is unlocked. It is further provided that the operation of the relay 1UK is checked by the circuits for the respective normal and reverse indication lamps 1N and 1R which include back contact of relay 1UK. It is thus provided that the lamp 1N is energized to indicate the operation of the track switch 1TS at field station No. 1 to its normal locked position upon the picking up of relay 1CK¹ during the indication cycle with relay 1UK dropped away, by a circuit extending from (+), including back contact 86 of relay 1UK, front contact 85 of relay 1N–RK, and lamp 1N, to (−). The magnetic stick characteristics of the relay IN-RK and IUK maintains these relays in their last actuated positions, irrespective of the dropping away of the relay ICK¹ at the end of the cycle.

Similarly if the tone fb is received during an indication cycle, the output of the filter fb in the block 82 is effective to trigger the gas tube 3T¹ and thus provide for the picking up of the relay 2CK¹ which is included in the anode-cathode circuit of the gas tube. Upon the picking up of relay 2CK¹, the closing of front contact 87 provides for the energization of the lower winding of the relay IN-RK with a polarity to actuate the contacts of that relay to their dropped away positions and thus select the energization of the lamp IR and the deenergization of the lamp IN in accordance with the indication received that the track switch at field station No. I has been actuated to its reverse locked position. The circuit for the lower winding of relay IN-RK extends from (+), including front contact 87 of relay 2CK¹, lower winding of relay IN-RK and upper winding of relay IUK, to (−). The energization of the upper winding of relay IUK is of a polarity to actuate the contacts of that relay to their dropped away positions, and thus the lamp IR is energized by a circuit extending from (+), including back contact 86 of relay IUK, back contact 85 of relay IN-RK, and lamp IR, to (−).

If an indication is transmitted from the field station No. I that the track switch at that field station is unlocked and in mid-stroke, the tone fc is transmitted during an indication cycle, and the reception of such tone at the control office provides for an output of the corresponding filter which is effective to trigger the gas tube 4T¹ and to pick up the relay 3CK¹ which is included in the anode-cathode circuit of that gas tube. Upon the picking up of relay 3CK¹, the closure of front contact 88 is effective to energize the lower winding of the relay IUK with a polarity to actuate the contacts of relay IUK to their picked up positions, and thus by the opening of back contact 86, the circuits for the normal and reverse lamps IN and IR are opened, and a circuit is closed at front contact 86 for energization of the lamp IU to indicate that the track switch ITS at field station No. I is unlocked from its full normal and full reversed positions.

In a similar manner, as other indications are received from field station No. I during an indication cycle, respective gas tubes for such indications are fired, and indicator lamps or other indication devices are controlled, in accordance with the firing of these tubes according to the requirements of practice.

It has been described that the tones transmitted during an indication cycle are preferably transmitted one at a time, rather than being transmitted simultaneously, to prevent the generation of undesirable beat tones, and for other desirable reasons which are apparent in the practice of the invention. Thus the tones f are transmitted during an indication cycle in alphabetical order as defined by the letter suffixes, and the slow release relay SL¹ which governs the deionization at the end of a cycle of the gas tubes 2T¹, 3T¹, 4T¹ and other gas tubes not shown is made sufficiently slow in releasing so that such relay is maintained picked up until the last tone of the cycle is received, even though it is deenergized upon the reception of the first tone. More specifically, the energizing circuit for the relay SL¹ includes the back contacts connected in series of all of the relays CK¹ which are associated with the respective gas tubes used in receiving indications during an indication cycle transmitted by field station No. I. The circuit for the relay SL¹ is illustrated as extending from (+), including contacts indicated by XX of other relays CK¹ which are not shown, back contacts 89 of relay 3CK¹, back contact 90 of relay 2CK¹, back contact 91 of relay ICK¹, and winding of relay SL¹, to (−). It is thus provided that the timing of the dropping away of relay SL¹ is initiated by the first tone received, and the relay SL¹ in dropping away opens the common connection of the respective gas tubes 2T¹, 3T¹, 4T¹, and others not shown, to the B supply battery 58 at front contact 83 to provide for the deenergization of these tubes and the dropping away of the associated relays CK¹. When the last of the relays CK is dropped away, the pick up circuit is reestablished for the relay SL¹ so that such relay is picked up to complete the conditioning of the apparatus at the control office for the reception of a subsequent indication cycle from field station No. I. It has been pointed out when considering the mode of operation upon transmission of an indication cycle from field station No. I that in case successive indication cycles are to be transmitted there is a sufficient time delay between the termination of one cycle and the initiation of the next cycle to allow for the restoration of the slow release SL¹ at the control office between cycles.

It has been illustrated that the slow release relay SL¹, for example, is effective to deionize the gas tubes used in the reception of indications, while the relay CSP¹ has been provided for the deionization of the gas tube IT¹ which is associated with reception of the check pulse at the end of a control cycle. The use of separate relays for the deionization of these tubes is desirable because of the difference in timing that is desired. In other words, the duration of the check pulse is relatively short as compared to the duration of an indication cycle, and therefore the relay CSP¹ is made quicker in dropping away than the relay SL¹. In this manner, the deionization of the tube IT¹ at the end of a check pulse is not unnecessarily delayed, as would be the case if that tube were to be deionized by the dropping away of the relay SL¹ which must necessarily be slow enough in releasing as above described to provide for the reception of a complete indication cycle before deionization becomes effective.

Having thus described the reception of indications assumed to be transmitted from field station No. I, it is to be understood that this description is typical of the circuit organization and mode of operation for the reception of indication cycles transmitted by other field stations, except that each field station has its particular distinctive carrier frequency to which selective appartus at the control office is distinctively responsive so as to permit the firing of only the gas tubes which are associated with the particular field station doing the transmitting. In other words, there are as many receiving circuits connected in multiple to the receiving antenna A2 at the control office as there are field stations that can transmit indications, and each of these receiving circuits is adapted to pass only the sideband of the carrier F corresponding to its associated field station. It is therefore provided, for example, that if only field station No. I is transmitting, only the amplifier 92 has an output which feeds its associated group of indication apparatus, and there is no output of the amplifier 93 for the energization of its associated group of indication responsive apparatus. If, however, both field station No. 1 and field station No. 2 should transmit simultaneously, the output of the amplifier 92 would be strictly in accordance with the tones transmitted from field station No. 1, and the output of amplifier 93 would be strictly in accordance with the tones transmitted by station No. 2. Thus the respective groups of indication responsive apparatus associated with the respective field stations Nos. 1 and 2 are simultaneously conditioned whenever simultaneous transmission of indications by field stations Nos. 1 and 2 is effective, all without interference between the respective control cycles transmitted. In a similar manner it will be readily apparent that as many field stations may transmit indication cycles simultaneously as there are stations included in the system, the receiving apparatus for such field stations being organized at the control office similar to the organization of the apparatus for the typical field stations Nos. 1 and 2 illustrated in Fig. 2.

Although the centralized traffic control system according to this embodiment has various attributes relative to dependable communication of controls and indications, when used in combination as a whole, it will be readily apparent to those skilled in the art that many such attributes can be employed or not, according to the requirements of practice, and various novel features of the present invention are not limited to space radio communication but may be applied to a line wire carrier centralized traffic control system.

Having thus described a specific centralized traffic control system for a particular stretch of track as one embodiment of the present invention, it is desired to be understood that this form is selected to facilitate the disclosure of the invention rather than to limit the number of forms which the invention may assume, and it is to be further understood that various adaptations, alterations and modifications may be applied to the specific form shown to meet the requirements of practice, without in any manner departing from the spirit or scope of the present invention except as limited by the appending claims.

What I claim is:

1. In a normally at rest communication system of the character described for the communication of indications from a plurality of field stations to a control office by radio wave transmission during respective indication cycles of operation in which a different frequency band is used for transmission by each field station, receiving apparatus at the control office comprising a band-pass filter for each of the field stations effective to pass only the band of frequencies transmitted by that field station, frequency responsive indication means including a plurality of gas filled tubes associated with each of said band-pass filters governed by the output of that band-pass filter and distinctively responsive to each of a plurality of frequencies to thereby selectively activate said tubes, timing means associated with the indication receiving apparatus for each field station, said timing means being initiated by the first frequency received during an indication cycle transmitted by that station for measuring a predetermined time interval and then being restored to normal, and means controlled by said timing means to deactivate said gas tubes at the end of each predetermined time interval.

2. In a centralized traffic control system for railroads for communication of controls from a control office to a plurality of field stations for devices at such field stations, transmitting apparatus at the control office comprising, a change relay for each field station responsive to the manual designation of controls to be transmitted to that field station, a code determining relay for each field station for rendering effective the selection of code characters for transmission to its associated field station during a control cycle, circuit means for energizing said code determining relay in response to said change relay for that field station, said circuit means being effective to energize only one code determining relay at a time, a check relay for each field station responsive to a distinctive indication received from that field station, and stick circuit means for maintaining said code determining relay energized, said stick circuit means being dependent for release of said code determining relay upon the response of said check relay to an indication received from the associated field station subsequent to each control cycle transmitted for that field station.

3. In a centralized traffic control system of the character described for the communication from a control office to a plurality of field stations of controls for devices at such field stations by the transmission of distinctive pulses, transmitting apparatus at the control office comprising, initiating means for each field station for initiating the transmission of selected distinctive control code pulses to that field station, a code determining relay for each field station for rendering effective a selection of code characters for transmission to its associated field station, circuit means for energizing said code determining relay in response to said initiating means for that field station, said circuit means being effective to energize only one code determining relay at a time, a check relay for each field station responsive to the reception of a distinctive indication transmitted from that field station, and stick circuit means for maintaining said code determining relay energized, said stick circuit means being dependent for release of said code determining relay upon the response of said check relay to an indication transmitted from the associated field station subsequent to the transmission of control code characters to that field station.

4. In a communication system wherein a control office communicates with a plurality of field stations, transmitting apparatus at the control office comprising, manually operable means for initiating the transmission of distinctive pulses to the respective field stations, a code determining relay for each field station for rendering effective selected distinctive pulses for transmission for its associated field station, circuit means for energizing said code determining relays in response to said manually operable means for that field station, said circuit means being effective to energize only one code determining relay at a time, check pulse receiving means for each field station responsive to a pulse received from that field station, manually operable contact means, and stick circuit means for maintaining said code determining relay energized, said stick circuit means being dependent for release on either the actuation of said manually operable contact means, or the response of said check pulse receiving means.

5. In a communication system for communicating between a control office and a field station by transmission of distinctive pulses during respective control and indication cycles of operation, transmitting apparatus at the field station comprising, check pulse initiating means for initiating the transmission of a check pulse in response to the termination of a control cycle transmitted from the control office, said initiating means being effective to delay transmission of a check pulse until an indication cycle is terminated, provided that the transmission of an indication cycle is in progress when a control cycle is terminated, indication cycle initiating means for initiating the transmission of an indication cycle in response to a change in the position of a device at that field station, said indication cycle initiating means being effective to delay initiation of an indication cycle until reception of a control cycle has been completed and until a check pulse is transmitted at the end of that control cycle provided that control cycle is in progress when there is a change effected in the position of said device.

6. In a communication system of the character described for the communication of controls from a control office to a plurality of field stations for devices at such stations, manually operable initiating means at the control office for initiating a cycle of operation for the transmission of controls for any selected field stations, transmitting apparatus at the control office comprising a radio transmitter generating a carrier current, tone generators for generating respective station and control tones for use in communicating respective station selection and control intelligence to the field stations, a first stepper normally at rest and initiated by said initiating means for selecting the transmission of a station selection tone at the beginning of a control cycle, said stepper being effective to scan said manually operable initiating means for all of the field stations each time it is initiated so as to give each of such means a chance to initiate but one control cycle during one cycle of operation of said stepper, a second stepper effective to select respective control tones for transmission, one at a time, subsequent to the transmission of a tone for station identification, a modulator acting to modulate said carrier current in accordance with the respective tones selected by said second stepper, and electro-responsive means at the respective field stations distinctively responsive to the respective modulations of said carrier current.

7. In a communication system for communication by distinctive tones of a plurality of selected controls from a control office to any designated one of a plurality of field stations for devices at that field station, the combination with manually operable initiating means at the control office for each field station for initiating a control cycle of operation for the communication of controls to that field station, of transmitting apparatus at the control office comprising, a distinctive station tone generator for each of the field stations, a distinctive control tone generator for each position of each of said devices at any one field station, a stepper normally at rest and initiated by said initiating means for transmitting control tones to a field station designated by said manually operable initiating means, said stepper being effective to select transmission of subsequent control tones, one at a time, and electro-responsive means at a given one of said field stations for controlling said devices in accordance with the respective tones transmitted from the control office by said transmitting apparatus, said electro-responsive means being distinctively responsive to different combinations of control tones transmitted during a control cycle.

8. In a centralized traffic control system in which indications of positions of respective devices at a plurality of field stations are provided at a control office, transmitting means at each of the field stations comprising, a high frequency generator of a frequency current distinct from that of the corresponding generator for each other field station, a relatively low frequency generator for each distinctive position of each device at that field station to be indicated at the control office, a stepper that is normally at rest, operating circuit means for said stepper effective when initiated to operate the stepper step-by-step through a complete indication cycle of operation, initiating means for initiating said operating circuit means in response to a change in one of the devices to be indicated, means selected by said stepper for modulating the high frequency current of said high frequency generator during an indication cycle by the frequency currents of a plurality of low frequency generators, said stepper permitting the modulation by but one low frequency generator at a time, and receiving means at the control office permitting the conditioning of indication devices for each field station in response to modulated carrier current transmitted from a field station, only provided that such modulations are applied to the distinctively generated carrier current for registration of that field station, said receiving means being distinctively conditioned by different frequencies of said low frequency generator for selectively governing indications as to the positions of said devices.

9. In a centralized traffic control system for the communication by distinctive modulations of a constant carrier current of controls from a control office to a plurality of field stations for devices at such field stations, initiating means at the control office for initiating a control cycle of operation for the communication of controls to any selected field station, tone generators at the control office operating at distinctive frequencies corresponding to predetermined controls for devices at the field stations, normally at rest selector means rendered active to operate step by step in response to the actuation of said initiating means for determining the tones to be transmitted to the field stations in accordance with controls preselected for the field station for which the system has been initiated, a radio transmitter generating a carrier current at a constant frequency, a modulator acting to modulate said carrier current in accordance with the tones selected by said selector means on its successive steps, a selective circuit for permitting the radiation of but a single side band of the modulated carrier current, and receiving means at one of the field stations tuned to the frequency of said side band and effective to govern said devices at that field station in accordance with the tones that have been used for modulation of said carrier current at the control office, said receiving means being distinctively responsive to different tone frequencies for governing said devices, irrespective of the order in which such tones are transmitted.

10. In a system for transmitting controls from a central office to any desired one of a plurality of field stations by space radiation of pulses of carrier frequency distinctively modulated to comprise a control cycle, transmitting means at the central office effective to transmit a pulse characteristic of any designated one of the field stations followed by a series of pulses characteristic for such a designated field station, receiving means at each field station responsive to the pulses transmitted from the central office, station selecting means at each station rendered active only upon the reception of the pulse characteristic of that station and remaining active only for a limited measured time thereafter, and control receiving means at each station governed by said receiving means and said station selecting means at that station to be responsive to the reception of control pulses only when said station selecting means is rendered active during said limited time.

11. In a communication system for transmitting controls from a central station to any desired one of a plurality of field stations by the space radiation of pulses of carrier frequency distinctively modulated, transmitting means at the central office effective to transmit a series of successive pulses including a first pulse characteristic of a designated field station followed by pulses characteristic of the controls to be transmitted to such designated station, radio receiving means at each station for receiving the pulses transmitted from said central office, station selecting means at each station momentarily controlled by its associated receiving means upon the reception of its station identifying pulse to be rendered active, said station selecting means remaining active only for a predetermined time after it has been initially controlled, and control means at each station governed by said radio receiving means in accordance with the received control pulses only during the predetermined time that the associated station selecting means is rendered active for receiving the control pulses.

12. In a normally at rest communication system for the communication of controls from a central office to a plurality of field stations by the distinctive modulation of a single radio carrier frequency, stepping apparatus at the control office operable when initiated to operate step by step through a cycle of operation to positions characteristic of the different stations and when set in any particular station position also being operable through a plurality of successive control positions, manually operable means for designating any one of a plurality of said field stations and also determining the controls for that station, circuit means for initiating operation of said stepping apparatus when any station is designated and causing said stepping apparatus to be set in the position corresponding to that station, circuit means effective when said stepping apparatus is in a position corresponding to a particular station to transmit a carrier pulse modulated to identify that station, said station pulse being followed by a series of pulses modulated to characterize the controls for such station, means at each field station responsive only to a pulse distinctive of that station and rendered active only for a limited time thereafter, and circuit means at each field station rendered responsive to control pulses only when said station selecting means is rendered active and only during said limited time, and means rendered active in response to said circuit means for storing said controls following said limited time and until that station again receives control pulses.

13. In a system where a series of distinctive pulses are to be received in succession, a pulse receiver, a plurality of gas tubes connected to said receiver, each being controlled so as to be activated upon the reception of a particular distinctive pulse regardless of the order of reception of such pulse, said gas tubes remaining activated until restored by the momentary interruption of their anode circuits, and timing means governed by said gas tubes and acting to be initiated for measuring a predetermined time following the first activation of any one of said tubes for momentarily interrupting the anode circuits of all of said tubes after said predetermined time to thereby restore them to their normal nonactivated conditions.

14. In a communication system of the character described for the communication of controls from a central office to a plurality of field stations for governing devices at such field stations, a change relay for each of said field stations, each being energizable in response to the activation of a manually operable push button, a code determining relay for each of said field stations, a normally at rest stepping means, circuit means for initiating operation of said stepping means when any one of said change relays is energized, said stepping means being operable step by step through its different positions corresponding to said field stations until it reaches that step corresponding to the field station for which said change relay is energized, circuit means effective on each step of said stepping means to energize the code-determining relay corresponding to the station for that step if the corresponding change relay is already energized, circuit means causing said stepping means to operate past any step only if both the start relay and the code-determining relay for that step are energized, transmitting means rendered effective when said stepping means is set in any station position for transmitting a pulse characteristic of that station followed by a series of control pulses for that station, and circuit means for maintaining said code determining relay energized on any step until an indication is received from the corresponding station that the controls therefor have been received, whereby said code determining relay is released and said stepping means can operate to the next successive step position and be restored to its normal position if no other change relays are energized.

15. In a communication system of the character described for the communication of controls from a central office to a plurality of field stations for governing devices at such field stations, a change relay for each of said field stations, each being energizable in response to the actuation of a manually operable push button, a code determining relay for each of said field stations, a normally at rest stepping means, circuit means for initiating operation of said stepping means when any one of said change relays is energized, said stepping means being operable step by step through its different positions corresponding to said field stations until it reaches that step corresponding to the field station for which said change relay is energized, circuit means effective on each step of said step means to energize the code-determining relay corresponding to the station for that step if the corresponding change relay is already energized, circuit means causing said stepping means to operate past any step only if both the start relay and the code-determining relay for that step are deenergized, transmitting means rendered effective when said stepping means is set in any station position for transmitting a pulse characteristic of that station followed by a series of control pulses for that station, circuit means for maintaining said code determining relay energized on any step until an indication is received from the corresponding station that the controls therefor have been received, whereby said code determining relay is released and said stepping means can operate to the next successive step and be restored to its normal position if no other change relays are energized, and manually operable means for releasing said code-determining relays independently of the reception of an indication from any field station, whereby the failure to receive an indication and the resulting failure of the continuing operation of said stepping means may be obviated by a manual operation.

16. In a communication system for the transmission of controls from a central office to a plurality of field stations, control office transmitting apparatus normally at rest but capable of being initiated into a control cycle of operation in response to the manual designation of any one of a plurality of field stations, said control office transmitting apparatus including station stepper means effective to permit the transmission of a station call pulse and associated control pulses to but one field station at a time, communication apparatus at each field station comprising station selecting means normally inactive and rendered active for a limited time in response to a station call pulse transmitted from the control office at the beginning of a control cycle, control means at each field station rendered active in response to said station selection means at that station to control the devices distinctively in accordance with the character of the control pulses received during a control cycle, check pulse transmitting means at each field station effective to transmit a pulse in response to the rendering inactive of said station selecting means at the end of each cycle of controls received at that field station, timing means at each field station initiated by the rendering inactive of said station selection means at the end of a control cycle for governing the duration of said check pulse, and circuit means at the control office rendered active only in response to the reception of a check pulse indicating at the control office that the last control cycle transmitted has been received at the proper field station for automatically causing said station stepping means to permit the transmission of a control cycle for a different field station.

DONALD BLAISDELL.

REFERENCES CITED

The following references are of record in the file of this patent:

UNITED STATES PATENTS

| Number    | Name      | Date           |
|-----------|-----------|----------------|
| 1,449,372 | Arnold    | Mar. 27, 1923  |
| 1,587,121 | Harlow    | June 1, 1926   |
| 1,913,188 | Bruckel   | June 6, 1933   |
| 2,052,581 | Richards  | Sept. 1, 1936  |
| 2,098,910 | Blake     | Nov. 9, 1937   |
| 2,111,352 | Blake     | Mar. 15, 1938  |
| 2,255,162 | Hart      | Sept. 9, 1941  |
| 2,258,341 | Snavely   | Oct. 7, 1941   |
| 2,369,662 | Deloraine | Feb. 10, 1945  |
| 2,368,826 | Hailes    | Feb. 6, 1945   |
| 2,393,021 | Cheek     | Jan. 15, 1946  |
| 2,394,080 | Laurenson | Feb. 5, 1946   |
| 2,395,132 | Mackenzie | Feb. 19, 1946  |
| 2,395,693 | Sorenson  | Feb. 26, 1946  |
| 2,399,738 | Howe      | May 7, 1946    |

FOREIGN PATENTS

| Number  | Country       | Date          |
|---------|---------------|---------------|
| 362,485 | Great Britain | Nov. 30, 1931 |